(12) United States Patent
Davoust

(10) Patent No.: US 11,665,406 B2
(45) Date of Patent: *May 30, 2023

(54) VERBAL QUERIES RELATIVE TO VIDEO CONTENT

(71) Applicant: Amazon Technologies, Inc., Seattle, WA (US)

(72) Inventor: Peter Martin Davoust, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 477 days.

This patent is subject to a terminal disclaimer.

(21) Appl. No.: 16/299,426

(22) Filed: Mar. 12, 2019

(65) Prior Publication Data

US 2019/0215577 A1  Jul. 11, 2019

Related U.S. Application Data

(63) Continuation of application No. 14/855,995, filed on Sep. 16, 2015, now Pat. No. 10,271,109.

(51) Int. Cl.
*H04N 21/422* (2011.01)
*H04N 21/81* (2011.01)
*H04N 21/488* (2011.01)
*H04N 21/478* (2011.01)
*G06F 3/16* (2006.01)
(Continued)

(52) U.S. Cl.
CPC ....... *H04N 21/8133* (2013.01); *G06F 16/243* (2019.01); *G06F 16/245* (2019.01); *G06F 40/20* (2020.01); *G06F 40/40* (2020.01); *G10L 13/04* (2013.01); *H04N 21/42203* (2013.01); *H04N 21/44008* (2013.01); *H04N 21/4722* (2013.01); *H04N 21/47815* (2013.01); *H04N 21/4882* (2013.01)

(58) Field of Classification Search
CPC ........... H04N 21/8133; H04N 21/4722; H04N 21/44008; H04N 21/42203; H04N 21/4882; H04N 21/47815; G06F 40/20; G06F 40/40; G06F 16/243; G06F 16/245; G06F 16/7343; G10L 13/04
See application file for complete search history.

(56) References Cited

U.S. PATENT DOCUMENTS 5,596,705 A   1/1997  Reimer et al.
5,692,212 A  11/1997  Roach
(Continued)

FOREIGN PATENT DOCUMENTS

WO    2014036413 A2    3/2014

OTHER PUBLICATIONS

International Searching Authority and Written Opinion dated Mar. 21, 2014 for PCT/US2013/057543 filed Aug. 30, 2013.
(Continued)

*Primary Examiner* — Alazar Tilahun
(74) *Attorney, Agent, or Firm* — Thomas | Horstemeyer, LLP

(57) ABSTRACT

Disclosed are various embodiments for processing verbal queries relative to video content. A verbal query that is associated with a portion of video content is received. The verbal query specifies a relative frame location. An action is performed based at least in part on the portion of the video content at the relative frame location.

18 Claims, 8 Drawing Sheets

(51) Int. Cl.
  *G06F 16/242* (2019.01)
  *G06F 16/245* (2019.01)
  *H04N 21/4722* (2011.01)
  *H04N 21/44* (2011.01)
  *G06F 40/20* (2020.01)
  *G06F 40/40* (2020.01)
  *G10L 13/04* (2013.01)

(56) References Cited

U.S. PATENT DOCUMENTS

| | | | |
|---|---|---|---|
| 6,065,042 A | 5/2000 | Reimer et al. | |
| 6,741,791 B1 * | 5/2004 | Wymore | G11B 27/105 386/200 |
| 7,293,275 B1 | 11/2007 | Krieger et al. | |
| 8,209,396 B1 | 6/2012 | Raman et al. | |
| 8,644,702 B1 | 2/2014 | Kalajan | |
| 8,689,255 B1 | 4/2014 | Gregov et al. | |
| 8,763,041 B2 | 6/2014 | Timmermann et al. | |
| 8,955,021 B1 | 2/2015 | Treder et al. | |
| 9,113,128 B1 | 8/2015 | Aliverti et al. | |
| 2002/0059610 A1 | 5/2002 | Ellis | |
| 2004/0133919 A1 | 7/2004 | Incentis | |
| 2005/0160465 A1 | 7/2005 | Walker | |
| 2005/0177538 A1 | 8/2005 | Shimizu et al. | |
| 2006/0271836 A1 | 11/2006 | Morford et al. | |
| 2008/0002021 A1 | 1/2008 | Guo et al. | |
| 2008/0066135 A1 | 3/2008 | Brodersen et al. | |
| 2008/0148317 A1 | 6/2008 | Opaluch | |
| 2008/0172293 A1 | 7/2008 | Raskin et al. | |
| 2008/0209465 A1 | 8/2008 | Thomas et al. | |
| 2008/0271068 A1 | 10/2008 | Ou et al. | |
| 2009/0019009 A1 | 1/2009 | Byers | |
| 2009/0094113 A1 | 4/2009 | Berry et al. | |
| 2009/0138906 A1 | 5/2009 | Eide et al. | |
| 2009/0187950 A1 * | 7/2009 | Nicas | G10L 13/00 725/56 |
| 2010/0153831 A1 | 6/2010 | Beaton | |
| 2010/0199219 A1 | 8/2010 | Poniatowski et al. | |
| 2011/0067061 A1 | 3/2011 | Karaoguz et al. | |
| 2011/0246495 A1 | 10/2011 | Mallinson | |
| 2011/0282906 A1 * | 11/2011 | Wong | G06F 16/434 707/780 |
| 2011/0289534 A1 | 11/2011 | Jordan et al. | |
| 2012/0072953 A1 | 3/2012 | James et al. | |
| 2012/0151530 A1 | 6/2012 | Krieger et al. | |
| 2012/0308202 A1 | 12/2012 | Murata et al. | |
| 2013/0014155 A1 | 1/2013 | Clarke et al. | |
| 2013/0057543 A1 | 3/2013 | Mann et al. | |
| 2013/0060660 A1 | 3/2013 | Maskatia et al. | |
| 2013/0339991 A1 | 12/2013 | Ricci | |
| 2014/0068670 A1 | 3/2014 | Timmermann et al. | |
| 2014/0208355 A1 | 7/2014 | Gregov et al. | |
| 2015/0156562 A1 | 6/2015 | Treder et al. | |
| 2015/0319510 A1 | 11/2015 | Isselmou et al. | |

OTHER PUBLICATIONS

"Entertainment is more amazing with Xbox SmartGlass," Xbox SmartGlass 1 Companion Application—Xbox.com, retrieved from "http://www.xbox.com/en-US/smartglass," retrieved Dec. 4, 2012.

"Wii U GamePad," Wii U Official Site—Features, retrieved from "http://www.nintendo.com/wiiu/features/," retrieved Dec. 4, 2012.

"Sony Pictures to smarten up Blu-ray with MovieiQ, the 'killer app for BO-Live,'" Engadget, retrieved from http://www.engadget.com/2009/06/18/sony-pictures-to-smarten-up-blu-ray-with-movieiq-the-killer-ap/, Jun. 18, 2009.

"Hulu 'Face Match' feature attaches an actor's entire history to their mug," Engadget, retrieved from http://www.engadget.com/2011/12/08/hulu-face-match-feature-attaches-an-actors-entire-h istory-to/, Dec. 8, 2011.

"TVPlus for the iPad," iTunes Store, retrieved from "http://itunes.apple.com/US/app/tvplus/id444774882?mt=B," updated Apr. 13, 2012.

U.S. Appl. No. 13/927,970 entitled "Providing Soundtrack Information During Playback of Video Content", filed Jun. 26, 2013.

U.S. Appl. No. 14/034,055 entitled "Playback of Content Using Multiple Devices", filed Sep. 23, 2013.

U.S. Appl. No. 13/709,768, filed Dec. 10, 2012 entitled "Providing Content Via Multiple Display Devices".

U.S. Appl. No. 13/778,846 entitled "Shopping Experience Using Multiple Computing Devices", filed Feb. 27, 2013.

U.S. Appl. No. 14/218,408 entitled "Enhancing Video Content With Personalized Extrinsic Data", filed Mar. 18, 2014.

U.S. Appl. No. 14/644,006 entitled "Unobtrusively Enhancing Video Content With Extrinsic Data", filed Mar. 10, 2015.

U.S. Appl. No. 14/826,508 entitled "Timeline Interface for Video Content", filed Aug. 14, 2015.

* cited by examiner

VERBAL QUERIES RELATIVE TO VIDEO CONTENT

CROSS-REFERENCE TO RELATED APPLICATIONS

This application is a continuation of, and claims priority to, U.S. patent application entitled "VERBAL QUERIES RELATIVE TO VIDEO CONTENT," filed on Sep. 16, 2015, and assigned application Ser. No. 14/855,995, which is incorporated herein by reference in its entirety.

BACKGROUND

People often want more information about the movies and other video content they are watching. To this end, people may search the Internet to find out more information about the video content. This information may include, for example, biographies of actors, production information, trivia, goofs, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to processing verbal queries by a user for information relative to video content currently being presented to the user. When a user is watching video content, such as a movie or a television program, the user may have a question about who or what is currently being shown. Trying to formulate a search query for entry into a search engine may be inconvenient and a distracting hassle while watching the video content. Moreover, it may be difficult for the user to describe exactly where in the video content something occurs. For example, a user may want to know the identity of a person who briefly appears seventeen minutes into a movie. Although the user may be able to locate a list of cast members who appear in the movie, it may be difficult for the user to determine precisely which cast member was shown at that specific time.

Various embodiments of the present disclosure introduce a voice-based interface for determining additional information about what is currently shown in video content. With these embodiments, users can ask questions such as "Who is the man riding on the bicycle?" and then receive the answers on-screen or read back via a speech interface. As will be discussed, with some queries, it may be helpful to employ a screen segmentation approach, where users can refer to a specific region of the screen. For example, users may refer to the upper left, the middle, or the bottom right of the screen, such as "Who is the person at the bottom right?" In some examples, boxes around known objects or a grid overlay may be rendered upon the video content to aid in disambiguation if needed.

Figure 1:
FIG. 1 is a pictorial diagram of an example scenario of a verbal query and response relative to video content in accordance with various embodiments of the present disclosure.
Figure 1:
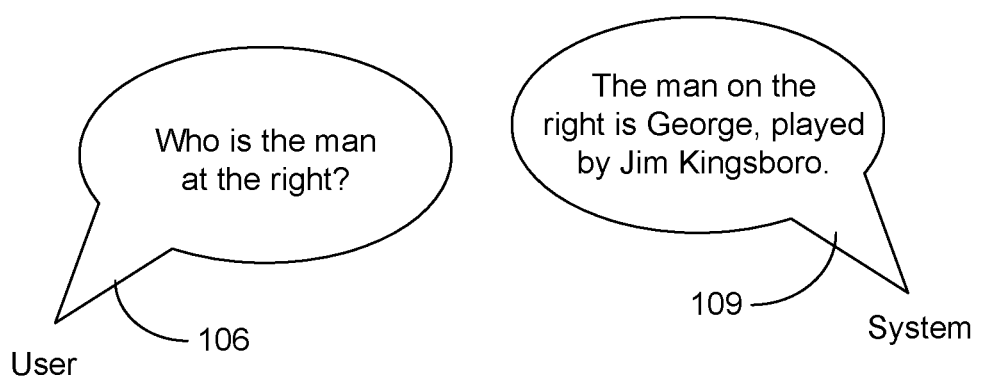

Turning now to FIG. 1, shown is an example scenario 100 in accordance with various embodiments. In the example scenario 100, video content 103 corresponding to a movie is rendered upon a display for viewing by a user. The video content 103 currently shows two characters, a man on the right and a boy on the left. While watching the video content 103, the user presents a verbal query 106 in the form of a question: "Who is the man at the right?" In the verbal query 106, the user requests information about a specific item depicted in the video content 103 ("the man"), and the user identifies the item using a relative frame location ("at the right").

The user speaks the verbal query 106 while watching the video content 103, and the speech is picked up by a system microphone. As will be described, the system performs natural language processing upon the verbal query 106, determines information to answer the verbal query 106, and generates an audio response 109 in reply to the verbal query 106. In this example, the response 109 indicates, "The man on the right is George, played by Jim Kingsboro." The response 109 in this case specifies the character name ("George") and the name of the cast member who plays the character ("Jim Kingsboro"). The response 109 may include other information in other examples, such as birthdate of the cast member, selected awards and/or filmography of the cast member, a description of the character, trivia, and/or other information. In various examples, the system may read out the response 109 using a speech synthesizer, or the system may present the response 109 via the display. In the following discussion, a general description of the system and its components is provided, followed by a discussion of the operation of the same.

Figure 2:
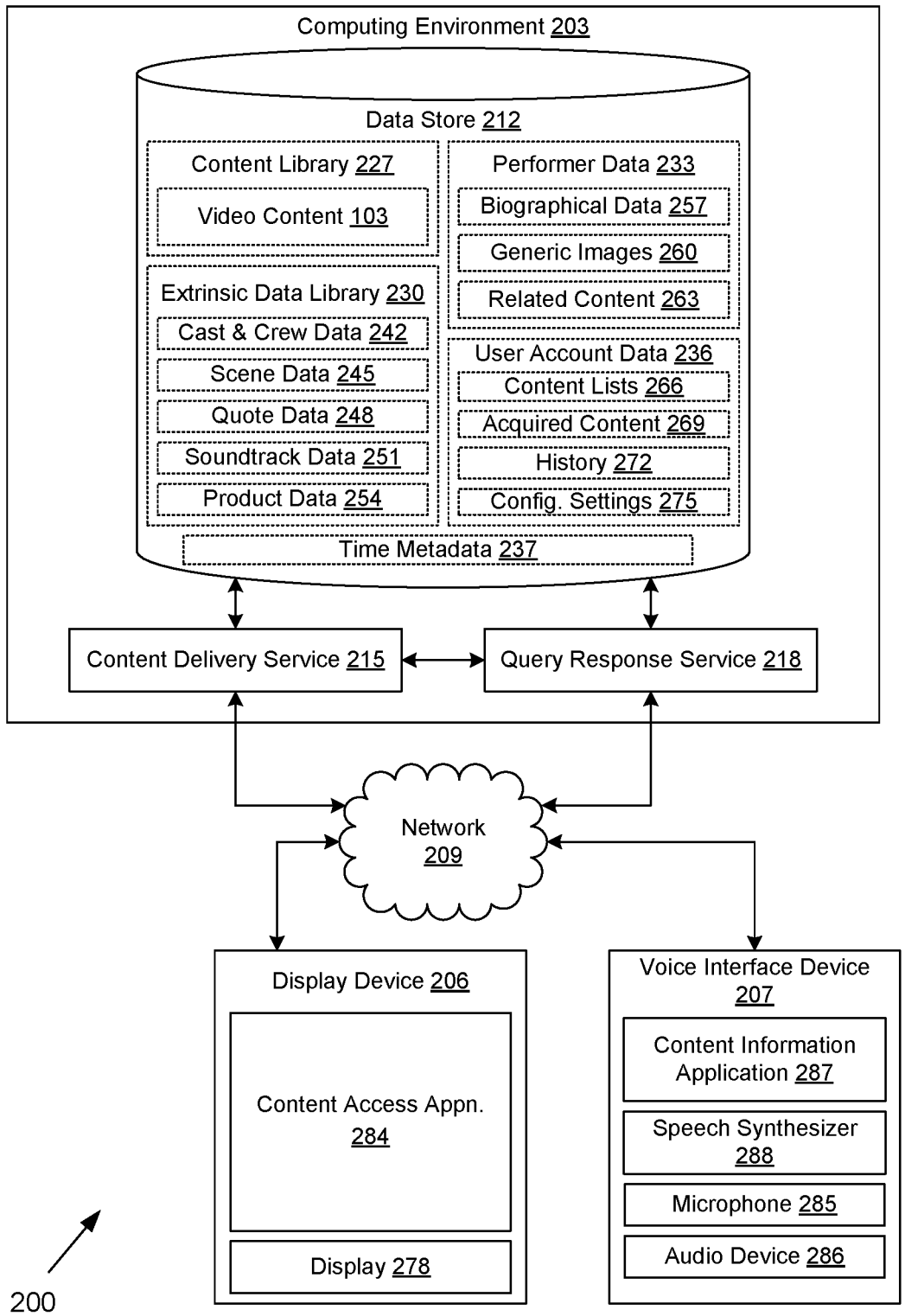
FIG. 2 is a schematic block diagram of a networked environment according to various embodiments of the present disclosure.

With reference to FIG. 2, shown is a networked environment 200 according to various embodiments. The networked environment 200 includes a computing environment 203, a display device 206, and a voice interface device 207 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, a query response service 218, and other applications, services, processes, systems, engines, or functionality not discussed in detail herein. The content delivery service 215 is executed to serve up or stream video content 103 (FIG. 1) to display devices 206. The content delivery service 215 may support a resume functionality such that playback of video content 103 may be stopped at a point in the video content 103 on one device and later resumed at that point on the same device or a different device.

The query response service 218 is executed to receive data encoding a verbal query 106 (FIG. 1) from a voice interface device 207, process the verbal query 106, and then generate a response 109 (FIG. 1) as an answer to the verbal query 106. As will be discussed, the query response service 218 may return a response 109 for presentation by the voice interface device 207. Alternatively, the query response service 218 may cause the response 109 to be presented via the display device 206, for example, as a graphical overlay on top of the video content 103. The query response service 218 may also cause a graphical overlay on top of the video content 103 to be presented for purposes of disambiguation, for example, to allow a user to verbally select one or more items for an information query when an initial verbal query 106 is unclear.

The data stored in the data store 212 includes, for example, a content library 227, an extrinsic data library 230, performer data 233, user account data 236, time metadata 237, and potentially other data. The content library 227 may include video content 103 such as movies, television shows, video clips, and/or other forms of video content 103. The video content 103 in the content library 227 may include accompanying audio, closed captioning text, and/or other data. It is noted that the content library 227 may be absent in some embodiments as the computing environment 203 may merely respond to verbal queries 106 with responses 109 and not actually present the content.

The extrinsic data library 230 includes various extrinsic data items that are associated with the video content 103. Non-limiting examples of the extrinsic data items may include names or descriptions of performers in the video content 103, biographies or filmographies of the performers, commentary, trivia, mistakes, user comments, images, and/or other data. The extrinsic data items may include curated data that is professionally managed, verified, or is otherwise trustworthy.

For example, the extrinsic data library 230 may include cast and crew data 242, scene data 245, trivia data 248, soundtrack data 251, product data 254, and/or other data. The cast and crew data 242 include the name, character information, images, and other data describing cast members who perform in video content 103 or crew members who are involved in the production of the video content 103. The images may correspond to generic images not taken from the video content 103 and/or character images captured from or defined as a portion of a frame of the video content 103.

The scene data 245 divides video content 103 into multiple scenes. A scene corresponds to a period of time in the video content 103 having multiple frames, and may be determined as having a distinct plot element or setting. The scene data 245 may identify the cast members or characters who perform in a given scene. In some cases, the scene data 245 may record the times when the cast members or characters first appear in the scene, last appear in the scene, or are on-screen. In some embodiments, the times may be represented as a frame number, or a range of frame numbers, in the video content 103. The scene data 245 may also include positional or location information as to where cast members and/or products appear within a frame on screen. The trivia data 248 may include various trivia items, goofs, and other interesting tidbits of information for the video content 103 and may be correlated with times in the video content 103 and/or scenes in the video content 103. In addition to trivia data 248, the extrinsic data library 230 may include data relating to quotations, user-generated comments, and so on, which may be correlated to particular times or scenes within the video content 103.

The soundtrack data 251 may include various information about the audio of the video content 103. For example, the soundtrack data 251 may identify that a particular audio track is being used at a certain time in the video content 103 or during a certain scene of the video content 103. The soundtrack data 251 may indicate whether the audio corresponds to a title or theme track. In addition, the soundtrack data 251 may identify performers who vocally perform as characters in the audio. Such performers may be considered cast members. However, such performers may differ from cast members who visually perform the same characters in some cases, for example, when a song is recorded by a vocalist and a different performer merely lip-syncs to the recorded song in the video of the video content 103.

The product data 254 may identify associations of products with times or scenes in video content 103. The products may correspond to any item offered for purchase, download, rental, or other form of consumption. For example, a particular brand of potato chips may be shown and/or mentioned in dialogue of a movie. The product data 254 may be used to promote products that are related to various scenes in the video content 103 at the appropriate times. Such promotions may be rendered relative to a position of the product within a frame of the video content 103. Such products may also include books, electronic books, soundtrack albums, etc. that are related to the video content 103. For example, the video content 103 may be an adaptation of a book, or the album might be for the soundtrack of the video content 103.

The performer data 233 may include information about performers in video content 103. Such performers may be on-screen performers, vocalists, and/or other performers. In some cases, the performer data 233 may include other participants in the video content 103 such as, for example, crew members and others. The performer data 233 may include biographical data 257, generic images 260, related content 263, and so on. The biographical data 257 may include various information such as stage name, birth name, date of birth, date of death, an editorially curated biography, and/or other information. Such data may be taken from editorially curated sources and/or non-editorially curated sources (e.g., "Wiki" sources).

The generic images 260 correspond to images of the performer which are taken when the performer is not performing a particular character. For example, such an image might be taken at an awards ceremony, at a press conference, at an informal setting, and/or elsewhere. Such an image may be a headshot or other image. Multiple generic images 260 may be provided for a particular performer. For example, a performer may have a lengthy career, and generic images 260 may be included for various times within the career. The related content 263 describes video content 103 in which the performer appears, directs, produces, or with which the performer is otherwise connected.

The user account data 236 includes various data about users of the content delivery service 215. The user account data 236 may include content lists 266, acquired content 269, history 272, configuration settings 275, and/or other data. The content lists 266 may correspond to watch lists, wish lists, shopping lists, "favorites" lists, favorite or bookmarked scenes within video content 103, and/or other user-managed lists of video content 103. The acquired content 269 describes to which content in the content library 227 a user has access. For example, a user may have rented or purchased particular video content 103. In some cases, a user may have a subscription that provides access to all or some of the video content 103. Such a subscription may be limited in some way (e.g., number of titles, number of bytes, quality level, time of day, etc.) or unlimited.

The history 272 may include various data describing behavior of a user. Such data may include a purchase history, a browsing history, a viewing history, explicitly configured viewing preferences, and/or other data. As understood herein, a "user" may refer to one or more people capable of using a given user account. For example, a user may include one or more family members, roommates, etc. In various embodiments, the extrinsic data may be presented based at least in part on general history of a user account, history of a user account that is attributable to a specific person, and/or history of one or more related user accounts.

The configuration settings 275 may include various parameters that control the operation of the query response service 218 and the voice interface device 207. For example, the configuration settings 275 may encompass profiles of a user's voice, dialect, etc. to aid in recognition of the user's speech. Preferences such as whether to present information on screen or via the voice interface device 207 may also be stored.

The time metadata 237 is used to correlate specific points in time in respective video content 103 with items in the extrinsic data library 230 and/or the performer data 233. For example, a given frame in video content 103 may be associated with various items, comprising people, objects, locations, etc., that are depicted, discussed, heard, or otherwise associated with the video content 103. The items may be associated with corresponding relative frame locations.

The display device 206 and the voice interface device 207 are representative of a plurality of client devices that may be coupled to the network 209. Each of the display device 206 and the voice interface device 207 may comprise, for example, a processor-based system such as a computer system. Such a computer system may be embodied in the form of a smart television, a desktop computer, a laptop computer, personal digital assistants, cellular telephones, smartphones, set-top boxes, music players, web pads, tablet computer systems, game consoles, electronic book readers, or other devices. The display device 206 is employed to render video content 103 for presentation to users, while the voice interface device 207 may be employed to receive voice commands from users and respond through a synthesized speech interface. Although described as separate devices, the display device 206 and the voice interface device 207 may correspond to a single client device performing both sets of functions in one embodiment.

The display device 206 may include one or more displays 278. Each display 278 may comprise, for example, one or more devices such as liquid crystal display (LCD) displays, gas plasma-based flat panel displays, organic light emitting diode (OLED) displays, LCD projectors, or other types of display devices, etc. In some embodiments, the display 278 may correspond to a touchscreen display. The display device 206 may be configured to execute various applications such as a content access application 284 and/or other applications.

The content access application 284 may be executed in a display device 206, for example, to access network content served up by the computing environment 203 and/or other servers, thereby rendering a user interface on the display 278. The content access application 284 in particular is executed to obtain video content 103 from the content delivery service 215 and to render the video content 103 on the display 278. Additionally, the content access application 284 may be configured to obtain extrinsic data from the content delivery service 215 and to render a user interface based at least in part on the extrinsic data to enhance the user experience in viewing the video content 103. In one embodiment, the content access application 284 may be a plug-in of a browser or otherwise executed in the environment of a browser. The display device 206 may be configured to execute other applications such as, for example, mobile applications, email applications, social networking applications, etc.

The voice interface device 207 may include one or more microphones 285 and one or more audio devices 286. The microphones 285 may be optimized to pick up verbal commands from users in the same room as the voice interface device 207. In receiving and processing audio from the microphones 285, the voice interface device 207 may be configured to null and ignore audio from video content 103 that is being presented by the display device 206. Thus, the voice interface device 207 is capable of discerning verbal commands from users even while audio corresponding to video content 103 is simultaneously picked up by the microphones 285. The audio device 286 is configured to generate audio to be heard by a user. For instance, the audio device 205 may include an integrated speaker, a line-out interface, a headphone or earphone interface, a BLUETOOTH interface, etc. The display device 206 may be configured to execute various applications such as a content information application 287, a speech synthesizer 288, and/or other applications.

The speech synthesizer 288 may be executed to generate audio corresponding to synthesized speech for textual inputs. The speech synthesizer 288 may support a variety of voices and languages. The content information application 287 is executed to receive verbal queries 106 from users via the microphone 285 and to present responses 109 via the speech synthesizer 288 and the audio device 286. The voice interface device 207 may be configured to execute other applications such as, for example, mobile applications, email applications, social networking applications, etc.

In some embodiments, the voice interface device 207 functions merely to stream audio from the microphone 285 to the query response service 218 and to play audio from the query response service 218 via the audio device 286. In these embodiments, the speech synthesizer 288 may be executed server side in the computing environment 203 to generate an audio stream.

Next, a general description of the operation of the various components of the networked environment 200 is provided. To begin, a user may acquire rights to view video content 103 in a content library 227. A display device 206 associated with a user may request to stream or download video content 103 from the content delivery service 215. The video content 103 is sent to the display device 206 over the network 209. In an alternative embodiment, the video content 103 is available to the display device 206 on a computer-readable medium or via cable, satellite, or terrestrial broadcasting. The content access application 284 of the display device 206 renders the video content 103 on the display 278.

While the video content 103 is being rendered, the user may employ the voice interface device 207 to ask questions about the video content 103 relative to the portion of the video content 103 that is being rendered. The content information application 287 may be listening via the microphone 285 and may respond after hearing a specific wake word. Users may ask for a variety of information related to the current portion of the video content 103, such as for information about items currently shown on screen, information about what actions the on-screen items are involved with, information about the music currently playing in the video content, and so on. Users may also initiate purchases of items currently shown on screen or add the items to wish lists, watch lists, shopping carts, and so on.

Upon receiving the verbal query 106, the content information application 287 transmits the verbal query 106 to the query response service 218 via the network 209. The content information application 287 may perform some initial processing on the verbal query 106, such as converting the audio received from the microphone 285 either to text or profile representations.

The query response service 218 performs natural language processing on the verbal query 106 to determine the items that are inquired about and the nature of the inquiry, e.g., who, what, when, where, why, how, etc. The query response service 218 can then determine with respect to the time metadata 237 the items that are currently shown in the video content 103, within a predetermined threshold before or after the verbal query 106. Upon knowing the items, the query response service 218 can then formulate a response 109 in answer to the verbal query 106 based at least in part on data in the extrinsic data library 230, performer data 233, or other data.

The query response service 218 can provide the response 109 for presentation to the user via the content access application 284 or via the content information application 287. For example, graphical elements may be rendered by the content access application 284 to present the response 109 while the video content 103 is being rendered. Otherwise, the voice interface device 207 may read out the response 109 via the speech synthesizer 288 and the audio device 286.

Figure 3A:
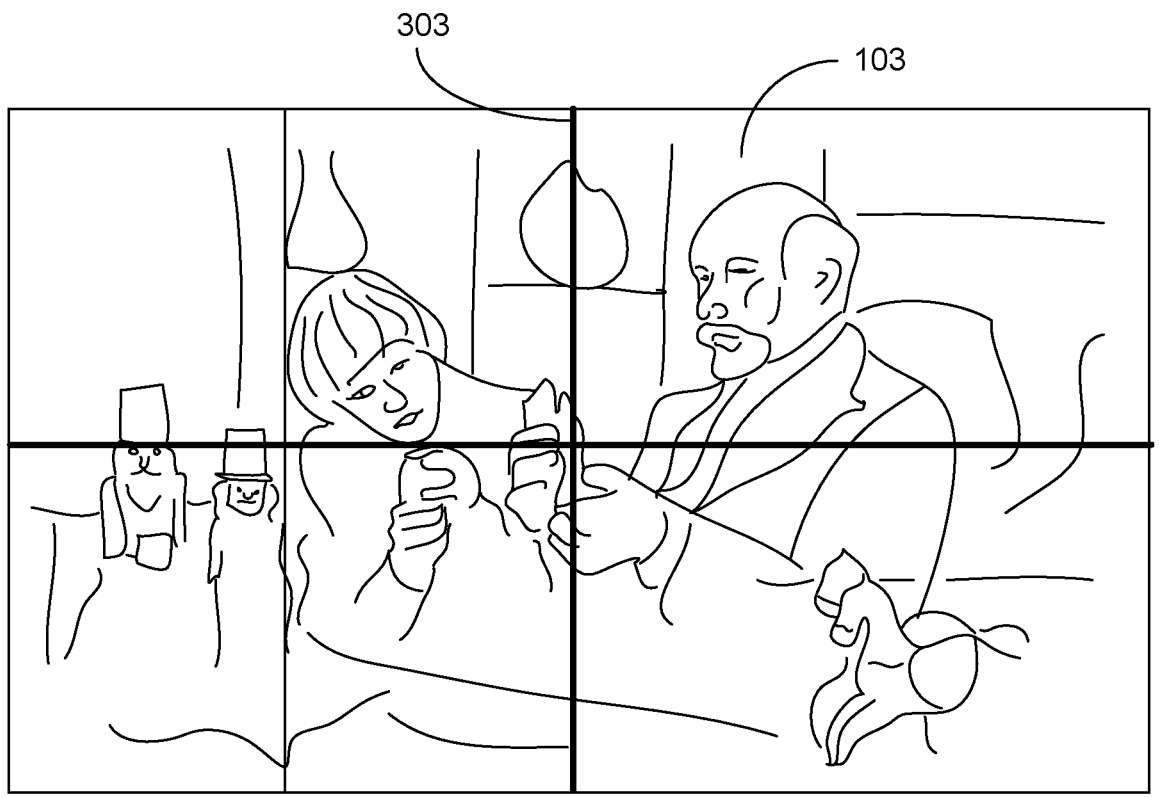
FIGS. 3A and 3B show an example of the video content of FIG. 1 with grids being superimposed thereon by the content access application in the networked environment of FIG. 2.

Referring next to FIG. 3A, shown is an example of the video content 103 of FIG. 1 with a grid 303 being superimposed thereon by the content access application 284 (FIG. 2). In some cases, a verbal query 106 may refer to a relative frame location that is unclear or ambiguous. In response, the grid 303 of a plurality of cells may be shown to facilitate easier specification of a relative frame location. In this example, the grid 303 divides the frame into four quadrants. A user may refer to a specific relative frame location in this grid 303 as "upper left," "upper right," "bottom left," or "bottom right," or through some other nomenclature. In another example, each cell may be rendered with a specific number or other indicia to ease identification in a verbal query 106. In various embodiments, the grid 303 may be shown automatically in the case of an unclear relative frame location, or the grid 303 may be shown in response to a user command (e.g., "show grid").

Figure 3B:
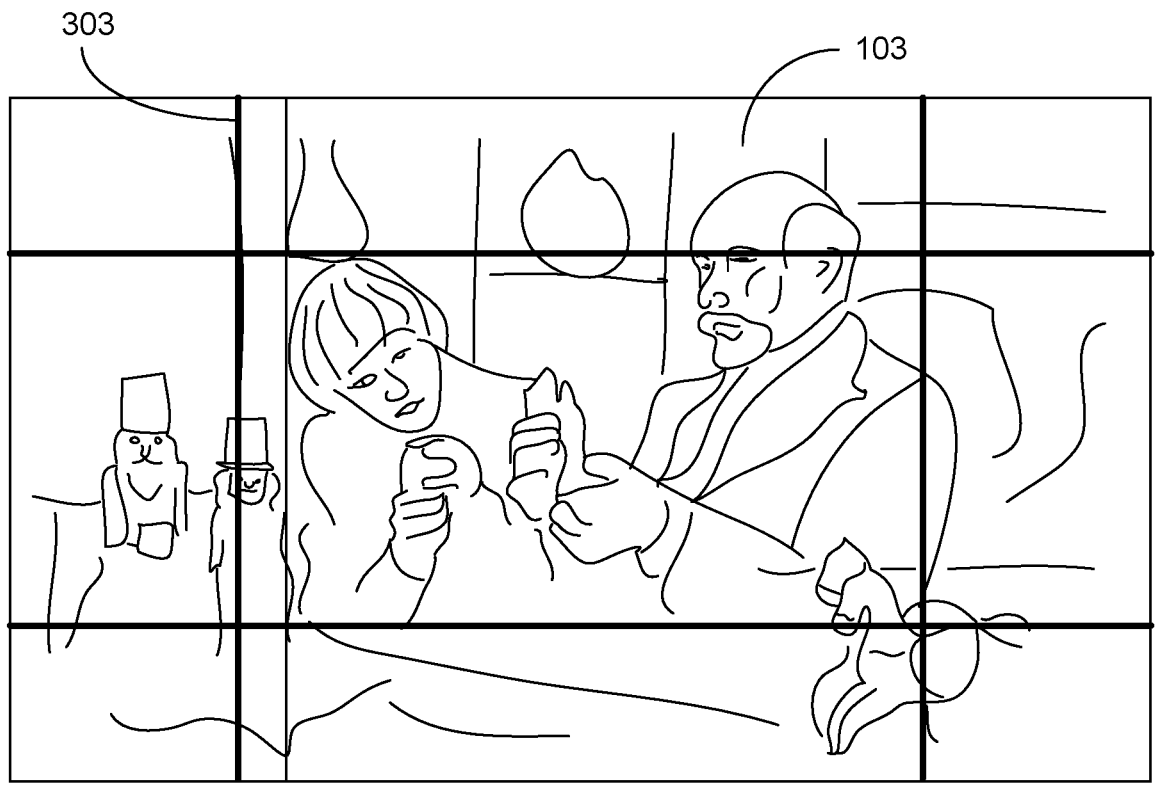

Moving on to FIG. 3B, shown is another example of the video content 103 of FIG. 1 with a different grid 303 being superimposed thereon by the content access application 284 (FIG. 2). It is noted that a variety of grids 303 may be used in various embodiments. Such grids 303 may divide the frame into halves, thirds, or some other equal or non-equal division. In some cases, cells within a grid 303 may overlap other cells. For example, a center cell may slightly overlap cells to the top, bottom, or side. As shown in FIG. 3B, the grid 303 may divide the frame into unequal portions. Further, as shown in FIG. 3B, the faces of some characters and some objects may be divided into multiple cells, and cells may include multiple faces and objects. Thus, a different grid 303 or a grid 303 having smaller cells may be employed to resolve an ambiguity if necessary.

Figure 3C:
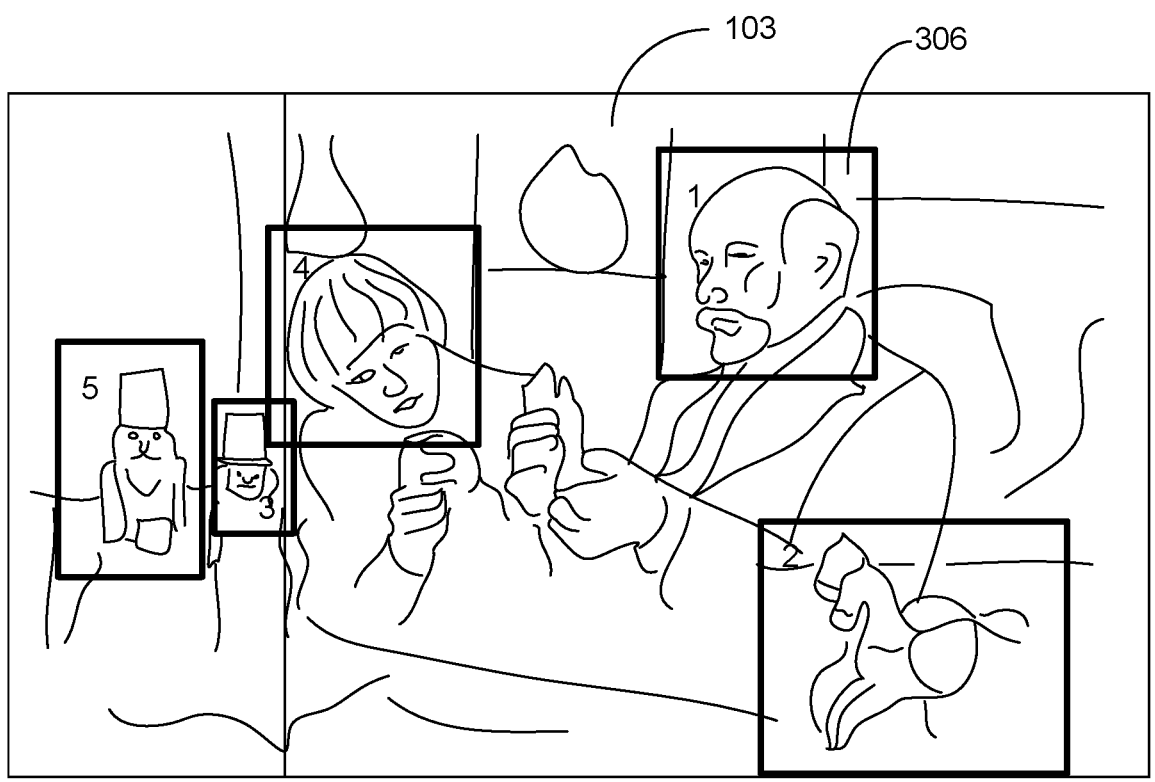
FIG. 3C shows an example of the video content of FIG. 1 with indicia being shown relative to each item depicted in the scene by the content access application in the networked environment of FIG. 2.

Turning now to FIG. 3C, shown is an example of the video content 103 of FIG. 1 with indicia 306 being shown relative to each item depicted in the scene. The indicia 306 may be rendered in response to an ambiguity in the verbal query 106 or in response to a user command (e.g., "show detected items"). The items may be detected in real-time in the case of a live feed (e.g., using face detection, object detection, etc.), or the items may be previously associated with the video content 103 in the time metadata 237 (FIG. 2). In this non-limiting example, the indicia 306 are rendered as bounding boxes, but in other examples, the indicia 306 may be highlighting, shading, circles, and so on. Associated with each indicia 306 may be an identifier that a user may refer to in a verbal query 106. For example, in this case, a user may ask, "What is the object at box three?" and an answer will be provided.

Figure 4:
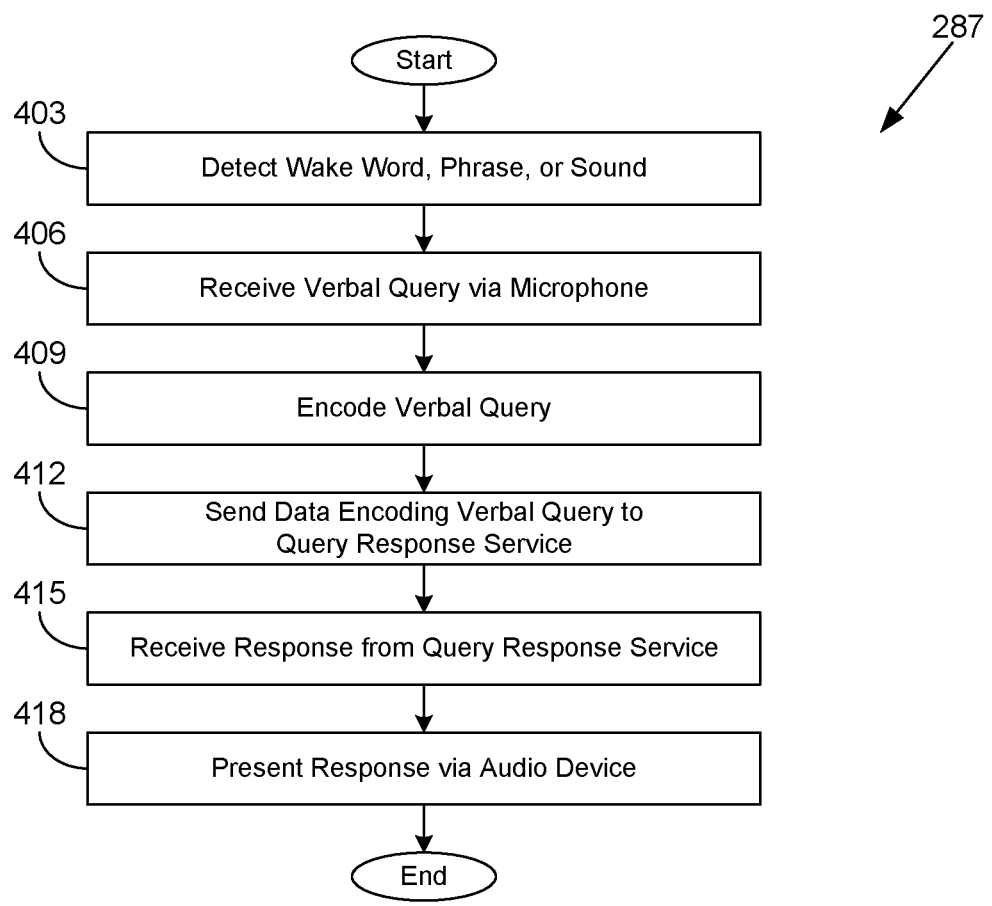
FIG. 4 is a flowchart illustrating one example of functionality implemented as portions of a content information application executed in a voice interface device in the networked environment of FIG. 2 according to various embodiments of the present disclosure.

Referring next to FIG. 4, shown is a flowchart that provides one example of the operation of a portion of the content information application 287 according to various embodiments. It is understood that the flowchart of FIG. 4 provides merely an example of the many different types of functional arrangements that may be employed to implement the operation of the portion of the content information application 287 as described herein. As an alternative, the flowchart of FIG. 4 may be viewed as depicting an example of elements of a method implemented in the voice interface device 207 (FIG. 2) according to one or more embodiments.

Beginning with box 403, the content information application 287 detects a wake word, phrase, or sound from a user through a microphone 285 (FIG. 2). For example, users may say "Wake up!" and/or clap their hands together twice, which would be preconfigured respectively as a wake phrase or sound. In some embodiments, the content information application 287 is always listening and a wake word, phrase, or sound is not required. In various scenarios, the content information application 287 may be activated via a button press on a remote control, or via a user action relative to a graphical user interface of an application of a mobile device.

In box 406, the content information application 287 receives a verbal query 106 (FIG. 1) from a user via the microphone 285. A silent pause may signal the end of the verbal query 106. In box 409, the content information application 287 encodes the verbal query 106 into text or a data profile. In some cases, the encoding may be user-specific and may depend on the user's dialect, manner of speaking, and language. Machine language approaches may be used to improve the accuracy of this encoding over time with respect to users indicating satisfaction with the query or asking different queries.

In box 412, the content information application 287 sends data encoding the verbal query 106 to the query response service 218 (FIG. 2). In box 415, the content information application 287 receives a response 109 (FIG. 1) as an answer to the verbal query 106 from the query response service 218.

In box 418, the content information application 287 presents the response 109 via the audio device 286 (FIG. 2) and the speech synthesizer 288 (FIG. 2). In some cases, the response 109 may be a follow-up question in order to prompt the user to provide additional information (e.g., disambiguation information) in order for the verbal query 106 to be properly answered. As an example, a grid 303 as in FIG. 3A or indicia 306 as in FIG. 3C may be rendered, and a user may be prompted to provide a verbal confirmation identifying one or more of the cells or indicia 306. As another example, if a user asks, "Who is the person at the right?" the query response service 218 may cause a follow-up question of "Do you mean the person with the red shirt or the person with the blue shirt?" to be presented to the user. This follow-up question may be presented verbally via the voice interface device 207 or visually via the content access application 284. The user may provide a verbal response of "The person with the blue shirt," which may be used to disambiguate the earlier verbal query 106 and to identify the particular item. Thereafter, the operation of the portion of the content information application 287 ends.

Figure 5:
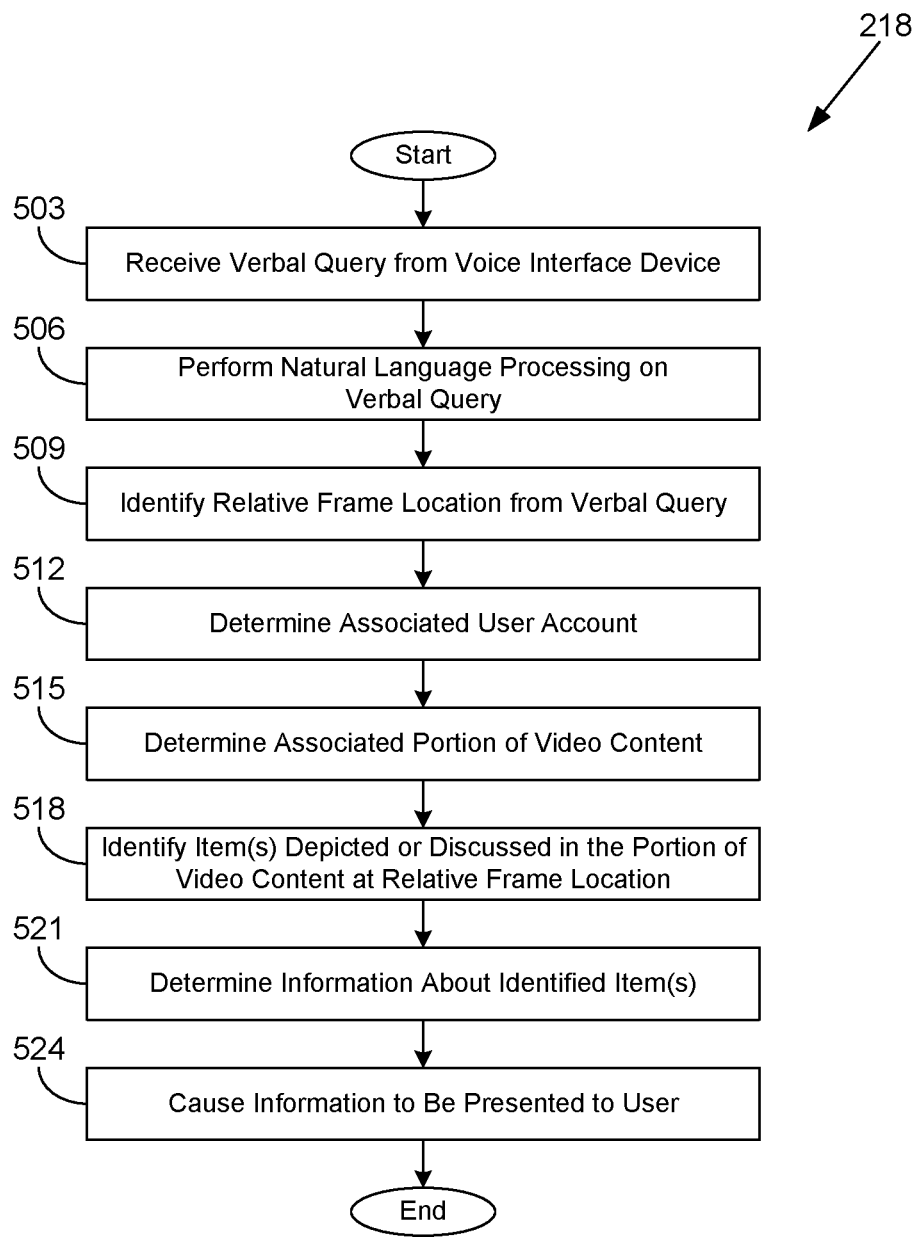
FIG. 5 is a flowchart illustrating one example of functionality implemented as portions of query response service executed in a computing environment in the networked environment of FIG. 2 according to various embodiments of the present disclosure.

Continuing to FIG. 5, shown is a flowchart that provides one example of the operation of a portion of the query response service 218 according to various embodiments. It is understood that the flowchart of FIG. 5 provides merely an example of the many different types of functional arrangements that may be employed to implement the operation of the portion of the query response service 218 as described herein. As an alternative, the flowchart of FIG. 5 may be viewed as depicting an example of elements of a method implemented in the computing environment 203 (FIG. 2) according to one or more embodiments.

Beginning with box 503, the query response service 218 receives a verbal query 106 (FIG. 2) from a voice interface device 207 (FIG. 2). In box 506, the query response service 218 performs natural language processing on the verbal query 106 to extract the subject of the query, the nature of the query, etc. For example, the query response service 218 may identify a relative frame location (e.g., "at the upper right") from the verbal query 106 in box 509. In box 512, the query response service 218 determines a user account associated with the verbal query 106.

In box 515, the query response service 218 determines a portion of video content 103 (FIG. 1) that is associated with the user account. For example, the query response service 218 may determine that a certain movie title is being streamed by the content delivery service 215 (FIG. 2) to a content access application 284 (FIG. 2) associated with the user account. Alternatively, the voice interface device 207 may record sounds that can be correlated via signatures/profiles with specific times in video content 103. The query response service 218 may determine a current time in that presentation and determine the portion of the video content 103 as a certain window before and/or after that time.

In box 518, the query response service 218 identifies one or more items depicted or discussed in the portion of the video content 103 at the relative frame location. For example, the time metadata 237 (FIG. 2) may point to specific items at specific relative frame locations for each time or frame in the video content 103. In box 521, the query response service 218 determines information about the identified item(s) in an answer to the verbal query 106.

In box 524, the query response service 218 causes the information to be presented to the user. Where the verbal query 106 asks for information about a person or cast member appearing in the video content 103, the information may include a cast member name or a character name of the cast member. In some cases, where the verbal query 106 specifies an item, the information may identify the action performed by the item.

The query response service 218 may return a textual response 109 to the voice interface device 207 to be read out to the user via the speech synthesizer 288 (FIG. 2) and the audio device 286 (FIG. 2). Alternatively, the query response service 218 may instruct the content delivery service 215 to cause a graphical element to be inserted by the content access application 284 (FIG. 2), where the graphical element is an overlay that presents the information on top of the video content 103. In some cases, the verbal query 106 may refer to placing an order for an item, potentially an item for which information was previously provided. In such cases, the query response service 218 may initiate the order of the item on behalf of the associated user account. Thereafter, the operation of the portion of the query response service 218 ends.

Figure 6:
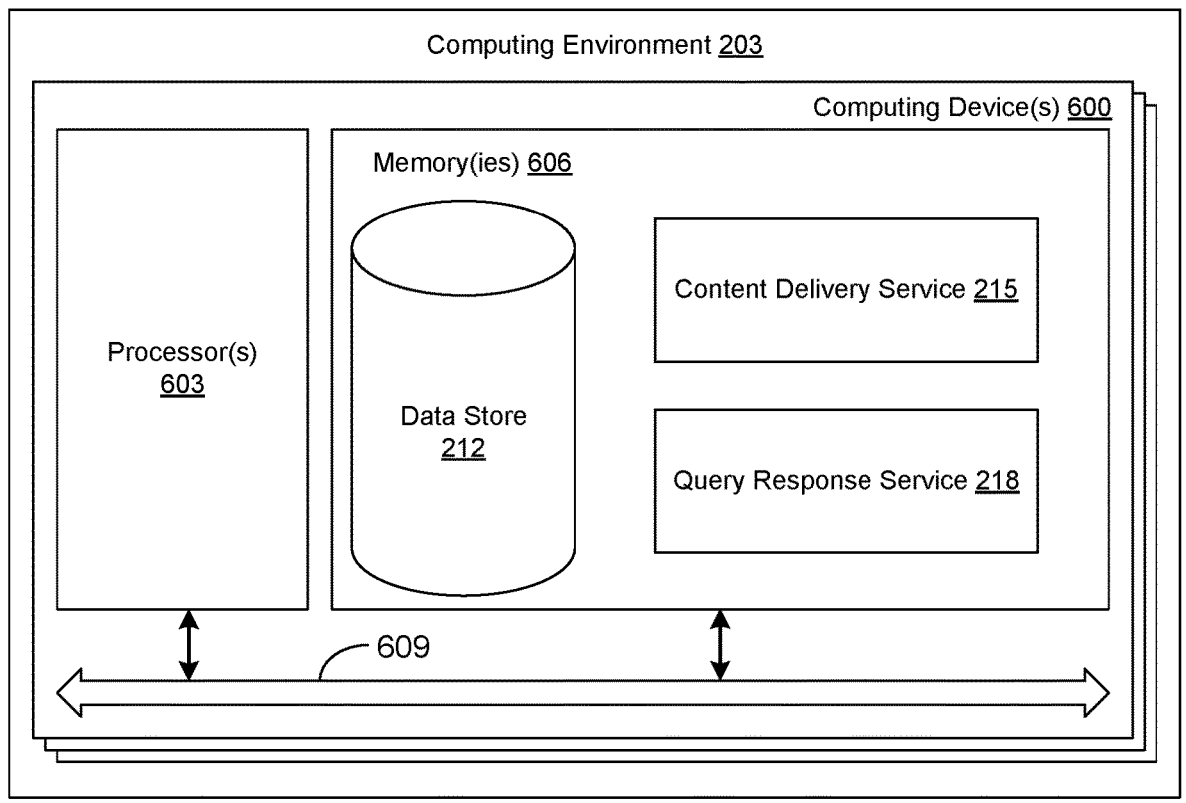
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the content delivery service 215, the query response service 218, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the content delivery service 215, the query response service 218, the content access application 284 (FIG. 2), the content information application 287 (FIG. 2), the speech synthesizer 288 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the content information application 287 and the query response service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the query response service 218, the content access application 284, the content information application 287, and the speech synthesizer 288, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the query response service 218, the content access application 284, the content information application 287, and the speech synthesizer 288, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   instructions executable in the at least one computing device, wherein when executed the instructions cause the at least one computing device to at least:
   receive a verbal query associated with a portion of video content;
   determine a region in a video frame expressed in relative terms within the verbal query;
   perform an action based at least in part on the portion of the video content at the region; and
   cause a grid to be rendered as an overlay on top of the video content via a display, the grid containing a plurality of cells, wherein the region specified by the verbal query is an identification of a particular cell of the plurality of cells.

2. The system of claim 1, wherein the action comprises identifying an item depicted in the portion of the video content at the region.

3. The system of claim 1, wherein the action comprises presenting information about an item discussed in the portion of the video content.

4. The system of claim 1, wherein the action comprises presenting information about an item depicted in the portion of the video content at the region.

5. The system of claim 1, wherein the action comprises presenting information about the portion of the video content at the region.

6. The system of claim 1, wherein when executed the instructions further cause the at least one computing device to at least:
   identify an ambiguity in the relative terms of the verbal query;
   and
   receive a verbal confirmation identifying one of the plurality of cells.

7. The system of claim 1, wherein when executed the instructions further cause the at least one computing device to at least:
   determine that an ambiguity exists in the verbal query;
   cause a follow-up question to be presented; and
   receive a verbal response to the follow-up question.

8. The system of claim 1, wherein when executed the instructions further cause the at least one computing device to at least:
   identify a plurality of items that appear during the portion of the video content;
   cause a plurality of indicia corresponding to individual ones of the plurality of items to be rendered as an overlay on top of the video content via a display; and
   wherein the region specified by the verbal query is an identification of a particular indicium of the plurality of indicia.

9. A method, comprising:
   receiving, by at least one computing device, a verbal query associated with a user account, the verbal query specifying a region of a video frame expressed in relative terms;
   identifying, by the at least one computing device, a portion of video content that is currently being presented via the user account;
   performing, by the at least one computing device, an action based at least in part on the portion of the video content at the region; and
   cause a grid to be rendered as an overlay on top of the video content via a display, the grid containing a plurality of cells, wherein the region specified by the verbal query is an identification of a particular cell of the plurality of cells.

10. The method of claim 9, wherein the action comprises identifying an item depicted in the portion of the video content at the region.

11. The method of claim 9, wherein the action comprises causing a speech synthesizer to announce information regarding the portion of the video content at the region via an audio device.

12. The method of claim 9, wherein the action comprises causing a graphical overlay with information regarding the portion of the video content at the region to be rendered on top of the video content via a display.

13. The method of claim 9, further comprising determining, by the at least one computing device, the region of the video frame expressed in the verbal query by natural language processing.

14. The method of claim 9, further comprising:
   determining, by the at least one computing device, that an ambiguity exists in the verbal query;
   causing, by the at least one computing device, a follow-up question to be presented;
   receiving, by the at least one computing device, a verbal response to the follow-up question; and
   determining, by the at least one computing device, the region based at least in part on the verbal response to the follow up question.

15. The method of claim 9, further comprising:
- identifying, by the at least one computing device, a plurality of items that appear during the portion of the video content;
- causing, by the at least one computing device, a plurality of indicia corresponding to individual ones of the plurality of items to be rendered as an overlay on top of the video content via a display; and
- wherein the region specified by the verbal query is an identification of a particular indicium of the plurality of indicia.

16. A non-transitory computer-readable medium embodying a program executable in at least one computing device, wherein when executed the program causes the at least one computing device to at least:
- receive a verbal query associated with a user account;
- perform natural language processing on the verbal query to determine a region of a video frame expressed in relative terms in the verbal query;
- identify a portion of video content that is currently being presented via a display associated with the user account;
- perform an action relative to the portion of the video content at the region; and
- cause a grid to be rendered as an overlay on top of the video content via a display, the grid containing a plurality of cells, wherein the region specified by the verbal query is an identification of a particular cell of the plurality of cells.

17. The non-transitory computer-readable medium of claim 16, wherein the action comprises identifying a cast member appearing in the portion of the video content at the region.

18. The non-transitory computer-readable medium of claim 16, wherein the action comprises identifying an item depicted in the portion of the video content at the region.

* * * * *